US012039507B2

(12) United States Patent  (10) Patent No.: US 12,039,507 B2
Gupta  (45) Date of Patent: Jul. 16, 2024

(54) TOUCHSCREEN ENABLED SMART CARD

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 154 days.

(21) Appl. No.: 16/879,910

(22) Filed: May 21, 2020

(65) Prior Publication Data

US 2021/0365906 A1  Nov. 25, 2021

(51) Int. Cl.
*G06Q 20/10* (2012.01)
*G06F 3/0482* (2013.01)
*G06F 3/0488* (2022.01)
*G06Q 20/32* (2012.01)
*G06Q 20/34* (2012.01)
*G06Q 20/40* (2012.01)

(52) U.S. Cl.
CPC ......... *G06Q 20/105* (2013.01); *G06F 3/0482* (2013.01); *G06F 3/0488* (2013.01); *G06Q 20/325* (2013.01); *G06Q 20/355* (2013.01); *G06Q 20/357* (2013.01); *G06Q 20/4012* (2013.01)

(58) Field of Classification Search
CPC .............................. G06Q 20/105; G06F 17/60
See application file for complete search history.

(56) References Cited

U.S. PATENT DOCUMENTS

| | | | | |
|---|---|---|---|---|
| 5,590,038 A | * | 12/1996 | Pitroda | G06Q 20/4093 705/41 |
| 8,348,151 B1 | * | 1/2013 | Block | G07F 19/207 235/379 |
| 8,467,770 B1 | * | 6/2013 | Ben Ayed | G06F 21/35 455/411 |
| 9,864,944 B2 | | 1/2018 | Radu et al. | |

(Continued)

FOREIGN PATENT DOCUMENTS

WO  WO-2008047338 A1 * 4/2008 ......... G06K 19/0719

OTHER PUBLICATIONS

"Handwriting Recognition," https://en.wikipedia.org/wiki/Handwriting_recognition, Wikimedia Foundation, Inc., Jan. 23, 2020.

(Continued)

*Primary Examiner* — Daniel S Felten
(74) *Attorney, Agent, or Firm* — Weiss & Arons LLP

(57) ABSTRACT

Wait times at ATMs may undermine the utility of these self-service machines. ATMs are configured to provide faster self-service kiosks that allow users to quickly perform common financial transactions. However, it has bees increasing common for users to have to wait on a line to access an ATM. Apparatus and methods are provided for a smart card that stages transactions by capturing the amount, pin and other necessary information on the smart card itself, before the user begins interacting with the ATM. Information captured by the smart card may be transferred to ATM when the smart card is inserted into ATM. The user does not provide the ATM with any additional information after inserted the smart card into the ATM, thereby improving the transaction processing efficiency of the ATM and enhancing user satisfaction.

16 Claims, 7 Drawing Sheets

(56) References Cited

U.S. PATENT DOCUMENTS

| | | | | |
|---|---|---|---|---|
| 10,311,414 | B1* | 6/2019 | Mossoba | G07F 7/125 |
| 11,068,768 | B1* | 7/2021 | Gupta | G06K 19/0719 |
| 11,074,489 | B1* | 7/2021 | Gupta | G06K 19/0724 |
| 2003/0030568 | A1* | 2/2003 | Lastinger | G06K 7/10297 |
| | | | | 340/8.1 |
| 2004/0124246 | A1* | 7/2004 | Allen | G06Q 20/108 |
| | | | | 235/492 |
| 2005/0210417 | A1* | 9/2005 | Marvit | G06F 1/1613 |
| | | | | 715/863 |
| 2013/0299592 | A1* | 11/2013 | Chiang | G06K 19/07309 |
| | | | | 235/492 |
| 2013/0305035 | A1* | 11/2013 | Lyne | G06Q 20/3278 |
| | | | | 713/150 |
| 2015/0067823 | A1* | 3/2015 | Chatterton | G06F 21/32 |
| | | | | 726/19 |
| 2016/0364717 | A1* | 12/2016 | Lyne | G06Q 20/3415 |
| 2017/0213120 | A1* | 7/2017 | Bae | G06K 19/0719 |
| 2017/0330173 | A1* | 11/2017 | Woo | G06K 19/0723 |
| 2017/0357979 | A1* | 12/2017 | Khurana | G07F 7/0846 |
| 2019/0286805 | A1 | 9/2019 | Law et al. | |
| 2021/0144557 | A1* | 5/2021 | Gulick, Jr. | G08B 21/0269 |
| 2021/0304164 | A1* | 9/2021 | Gupta | G06K 19/07709 |
| 2021/0326833 | A1* | 10/2021 | Evans | G06Q 20/145 |
| 2021/0365907 | A1* | 11/2021 | Gupta | G07F 7/1008 |

OTHER PUBLICATIONS

"Haptic Technology," https://en.wikipedia.org/wiki/Haptic_technology, Wikimedia Foundation, Inc., Apr. 23, 2020.
"Touchscreen," https://en.wikipedia.org/wiki/Touchscreen, Wikimedia Foundation, Inc., Apr. 30, 2020.

* cited by examiner

TOUCHSCREEN ENABLED SMART CARD

FIELD OF TECHNOLOGY

Aspects of the disclosure relate to improving transaction efficiency and operation of automated teller machines ("ATMs").

BACKGROUND OF THE DISCLOSURE

Wait times at ATMs may detract from the utility of these self-service kiosks. ATMs are deployed to provide self-service kiosks that allow users to quickly perform common financial transactions. However, it has been increasing common for users to have to wait before accessing an ATM while other users complete their transactions at the ATM.

An ATM may be capable of processing a higher number of financial transactions per unit of time than a human teller. However, an ATM transaction typically requires numerous inputs from a user before a transaction may be initiated and completed. For example, the ATM may first require a user to insert a card, such as a debit card, into the ATM. The card may include account or other information that links the user to one or more financial accounts. Information stored on the card may include a unique identifier and username.

Based on the information stored on the card, the ATM may prompt the user to enter a personal identification number ("PIN") associated with the card. The PIN may be used to authenticate the user at the ATM. After authenticating the user, the ATM may then prompt for inputs such as amount of money, an account selection or other transaction details. The prompting for information by the ATM, and the subsequent entry of a response by the user, all increase an amount of time each user may spend at the ATM.

Others may need to wait while a prior user responds to ATM prompts and completes their desired transaction. The lengthy wait time may increase user dissatisfaction and reduce a transaction efficiency of the ATM.

Some technology solutions exist for reducing the number of ATM prompts and required user responses. However, these solutions typically require additional third-party hardware and services, such as a mobile device or laptop/desktop computer system. These solutions, in addition to increasing costs associated with obtaining the third-party hardware and services, increases security risks. For example, a third-party device must be adequately secured to transmit and receive sensitive financial data. Communication between the third-party device and the ATM must also be secured. Furthermore, any sensitive financial data stored locally on the third-party device must be adequately secured to prevent unauthorized access to that data.

Accordingly, it would be desirable to reduce user wait-times at an ATM and improve the transaction efficiency of an ATM without relying on third-party hardware or services. It would be further desirable to improve the transaction efficiency of an ATM without imposing costs to procure and maintain third-party hardware or services. It would also be desirable to improve the transaction efficiency of an ATM without increasing security risks associated with third-party hardware and services.

Accordingly, it is desirable to provide apparatus and methods for a TOUCHSCREEN ENABLED SMART CARD.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
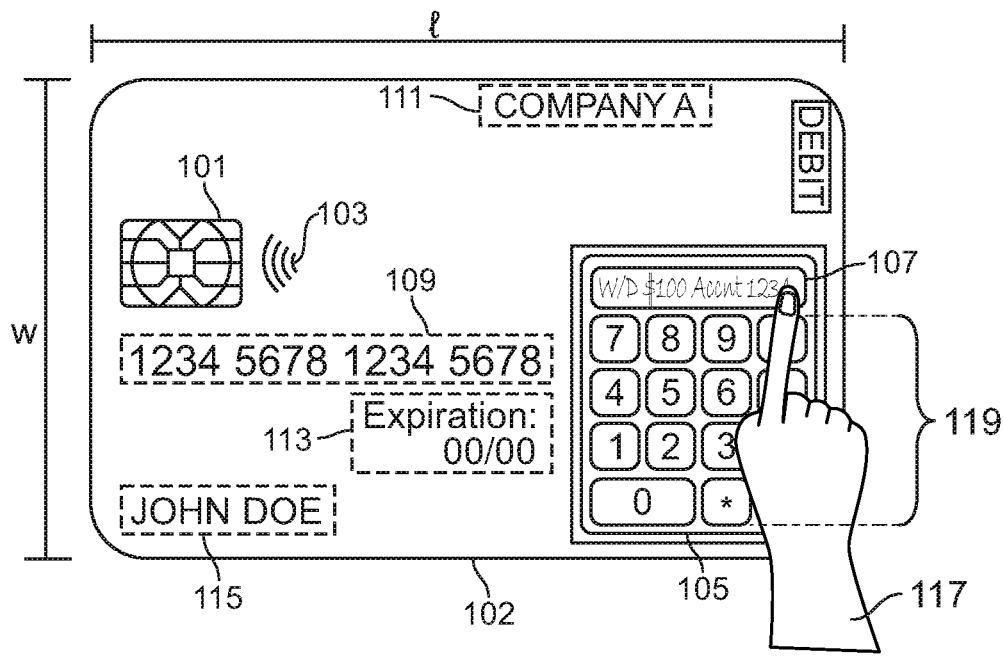
FIG. 1 shows an illustrative apparatus in accordance with principles of the disclosure.
Figure 1:
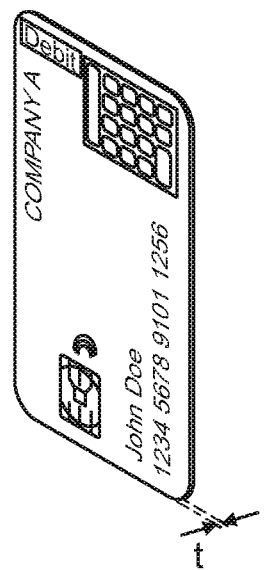

Apparatus for a smart card are provided. Apparatus may increase transaction processing efficiency of an Automated Teller Machine (ATM) or other self-service kiosk.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card, may include non-transitory memory locations within the housing. The microprocessor may access such memory locations. The non-transitory memory locations may be included in the microprocessor. The non-transitory memory locations may store software, that when executed by the microprocessor, cause the smart card to perform various functions. For example, the microprocessor may instruct a communication interface to scan for a wired or wireless communication channels and connect to a detected ATM.

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, a keypad or a communication interface of the smart card.

In some embodiments, the smart card may be activated in response to receiving, high frequency wireless signals. The high frequency signals may be detected by the communication interface. The high frequency signals may be broadcast by an ATM. The high frequency signals may be generated by a near field communication ("NIFC") reader. The high frequency signals may provide power to one or more components of the smart card. In some embodiments, in response to receiving the power, the microprocessor may be activated and begin to draw power from a battery on the smart card.

The smart card may operate in a networked environment. The smart card, may support establishing communication channels with one or more ATM's or other self-service kiosks. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of various well-known protocols such as TCP/TP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones multiprocessor systems, microcomputers, minicomputers, mainframe computers, distributed computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power a keypad, the communication interface and the microprocessor. The battery may have a thickness that is not greater than 0.5 mm.

The battery may be recharged via an electrical contact when the smart card is in contact with an ATM. The smart card's power source may include high frequency signals received from an ATM or other self-service kiosk. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to a rechargeable battery when the smart card is inserted into an ATM card reader.

The smart card may include a communication interface. The communication interface may have a thickness that is not greater than 0.8 mm. The communication interface may include circuity for establishing electronic communication with an ATM other self-service kiosk. The communication interface may be configured to implement protocols for wireless communication. The communication interface may include one or more antennae for transmitting and receiving wireless signals.

The communication interface may include communication circuitry. The communication circuitry may include software and/or hardware for establishing a wired or wireless communication channel with the ATM. The communication interface may be compatible with illustrative wireless channels such as Wi-Fi, Bluetooth, Ethernet, NFC, satellite and cellular telecommunications. Wi-Fi may include passive Wi-Fi with lower power consumption than typical Wi-Fi. The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

A microprocessor of the smart card may be configured to dynamically limit or expand transmitting and receiving ranges. The microprocessor may dynamically limit or expand transmitting and receiving ranges in response to detected location of the smart card.

For example, the microprocessor may expand a communication range when the smart card is within a "familiar" zone. Expanding a communication range may include using a Wi-Fi communication channel rather than an NFC communication channel. Expanding a communication range may include using a typical Wi-Fi range such as 150-300 ft. when searching for available ATM wireless communication channel and using passive Wi-Fi after establishing the communication channel with the ATM.

A familiar zone may be a pre-defined radius from a user's home or work location. The microprocessor may limit a communication range when the smart card is within an "unknown" zone. For example, the microprocessor may limit a communication restrict the smart card to using NFC or contact-based communication channels when operating in an unknown zone.

In some embodiments, the smart card may be activated in response to receiving wireless signals from the ATM. The wireless signals may provide power to one or more components of the smart card. Illustrative wireless signals may include NTC signals. For example, in response to receiving power via the wireless signals, a microprocessor of the smart card may be activated.

The smart card may include a battery for powering the communication interface and the microprocessor. The smart card may include an electrical contact that may be used to establish a wired or contact-based connection to the ATM.

For example, the smart card may include an "EMV" chip. EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the ATM. The battery of the smart card may be recharged via the at least one electrical contact when the smart card is in contact with the ATM via the EMV chip.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in, and protected by, the housing.

For example, an ATM may include a card reader constructed to receive a card that conforms to a predefined form factor. As illustrative form factor is defined in specifications published by the International Organization for Standardization ("ISO"). Illustrative specifications may include: ISO/IEC 7810, ISO/IEC 7811 and ISO/IEC 7816, which are hereby incorporated herein by reference in their respective entireties.

The smart card may include a keypad. The keypad may be mounted on an outside of the housing. The keypad may include mechanical keys. The keypad may be mounted on an outside of the horsing. The housing of the smart card may conform to the predefined form factor. The keypad may not increase the form factor of the smart card defined by the ATM for receiving the smart card. For example, the housing and the keypad mounted on an outside of the housing may collectively have a thickness that is not greater than 0.8 mm. An entire surface area of the smart card, including the keypad, may not exceed 86 mm×54 mm.

The ATM may utilize information stored on the smart card to authenticate a user at the ATM. In addition to information stored on the smart card, the ATM may prompt the user for additional information before allowing the user to initiate a transaction at the ATM. The additional information may include a PIN or biometric feature.

After authenticating the user, the ATM may allow the user to initiate a transaction at the ATM. Illustrative transactions may include withdrawing cash, transferring, funds between accounts or depositing cash/checks.

A user of the smart card may enter data using the keypad. The data entered by the user may be captured by the microprocessor. The user may enter data via the keypad that would typically be requested by the ATM when authenticating the user. The user may enter data via the keypad that would typically be requested by the ATM to initiate a transaction on behalf of the user.

The keypad may allow the user to enter data that will be needed by the ATM before accessing the ATM. Entering data before accessing the ATM may reduce an amount of time the user spends entering data after accessing the ATM. Reducing the amount of time the user spends entering data at the ATM may, in turn, reduce the amount of time other users spend waiting to access to the ATM. Reducing the amount of time each user spends entering data at the ATM may increase the number of transaction that the ATM may process per unit of time. Thus, reducing the amount of time anyone user spends entering data at the ATM may increase the transaction processing efficiency of the ATM.

Data entered using the keypad may include authentication information that would typically be requested by an ATM before providing a user access to one or more services of the ATM. For example, the user may enter a PIN or biometric feature. The authentication information may be encrypted and stored on the smart card. After capturing the authentication information, the smart card may present the authentication information to the ATM without requiring any further input from the user.

Other illustrative authentication information that may be entered via the keypad may include a user's name, an expiration date of the smart card, a card verification value ("CVV") or any other suitable data. The user may enter authentication information such as a telephone number, address or zip code.

Data entered using the keypad may include transaction information that would typically be requested by an ATM before implementing one or more services of the ATM. For example, the user may enter a cash withdrawal amount, bill denomination and currency using the keypad before reaching the ATM. The smart card may transmit the keyed-in transaction information to the ATM without requiring any further input from the user. The smart card may instruct the ATM to execute the withdrawal transaction without requiring any further input from the user.

In some embodiments, data entered using the keypad may be transferred to ATM when the smart card is inserted into or otherwise in communication with the ATM. In some embodiments, data entered using the keypad may be transferred to the ATM before the user inserts the smart card into the ATM. The data transferred to the ATM may be utilized by the ATM to complete transaction details that would have otherwise required prompting the user for inputs at the ATM. Capturing the data on the smart card before the user accesses the ATM reduces the amount of time a user needs to spend entering data at the ATM, thereby increasing the transaction processing efficiency of the ATM.

The smart card may include executable instructions. The executable instructions may be stored in a non-transitory memory. The executable instructions, when run by the microprocessor, may implement various functions of the smart card. The microprocessor may capture data entered using the keypad. The microprocessor may encrypt the captured data. The smart card may include a dedicated encryption controller for performing the encryption. The microprocessor may store the encrypted data locally on the smart card.

The microprocessor may formulate a set of transaction instructions executable by the ATM. The transaction instructions executable by the ATM may be formulated based on the data (e.g., transaction and authentication information) captured by the keypad. For example, the microprocessor may formulate transaction instructions for executing a transaction at the ATM. The microprocessor of the smart card may integrate the data captured from the keypad into the set of transaction instructions that are executable by the ATM.

The smart card may transfer the transaction instructions to the ATM. The smart card may transfer the transaction instructions in response to establishing a communication channel with the ATM. The communication interface may be used to establish the communication channel. For example, the smart card may establish the communication channel when the smart card is inserted into a card reader of the ATM. The ATM may autonomously initiate a transaction based on the authentication/transaction information included in transaction instructions stored on the smart card, thereby improving the transaction processing efficiency of the ATM.

For example, using the keypad, the smart card may capture a PIN and withdrawal amount from a user. The smart card may formulate a withdrawal request for the amount entered by the user. The smart card may formulate the withdrawal request before the user inserts the smart card into the ATM. The smart card may transfer the withdrawal request to the ATM for execution when the smart card is within a communication range of the ATM.

The smart card may include a communication interface that includes a wireless communication interface. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may only be used for transferring transaction instructions previously formulated by the smart card. In response to receiving transaction instructions, the ATM may initiate pre-processing of the user's desired transaction.

Pre-processing may include verifying any authentication information included in the set of transaction instructions. Pre-processing may include verifying that the user has sufficient funds available to warrant dispensing cash to the user. The pre-processing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes the transaction instructions received from the smart card.

The ATM may complete any pre-processing before the user approaches the ATM and inserts the smart card into the ATM. After completing the pre-processing, the ATM may detect that the smart card has been inserted into the ATM. The ATM may determine that it has pre-processed transaction instructions received from the smart card. The ATM may then execute the transaction implemented by the previously received transaction instructions without prompting the user for any additional data or inputs.

From a perspective of the user, the transaction may be executed in real time after the smart card is inserted into the ATM. For example, if the transaction instructions correspond to a withdrawal request, in response to inserting the smart card into the ATM, the ATM may provide the requested cash to the user.

In some embodiments, transaction instructions formulated by the microprocessor and stored locally on the smart card may not be transferred to the ATM before the smart card is inserted into the ATM. The built-in security protocols of an EMV chip on the smart card may provide verification of authentication information. After the ATM authenticates the user and the inserted smart card using the EMV chip, the smart card may then transfer the set of transaction instructions to the ATM.

Transaction instructions may be transferred to the ATM using a contact-based communication channel, such as via the EMV chip of the smart card. Such embodiments may provide an additional layer of fraud-mitigation by reducing the possibility that the set of transaction instructions may be intercepted during wireless transmission to the ATM. In some embodiments, even when the smart card is inserted into the ATM, transaction instructions may be transferred to the ATM using a wireless communication channel.

In some embodiments, the smart card may capture authentication information. The smart card may encrypt the authentication information and the authentication information locally on the smart card. The smart card may transfer the authentication information to the ATM. After receiving the authentication information, the ATM may not prompt the user for authentication information.

After the user inserts the smart card into the ATM, the smart card may interact directly with the ATM, without requiring any further authentication information from the user. The smart card may transfer the authentication information to the ATM in response to an authentication request submitted by the ATM directly to the smart card. The user may trigger the ATM to request the authentication information. For example, inserting the smart card into the ATM may trigger a request for authentication information. Actuating a button on the ATM may trigger a request for authentication information.

Transaction instructions may be formatted in a fashion that is understandable for processing by an ATM. The ATM may autonomously decrypt transaction instructions received from the smart card. The ATM may autonomously execute the transaction instructions and initiate a transaction (e.g., withdrawal) based on the transaction information (e.g., withdrawal amount and account) previously entered by the user. Transaction instructions formulated by the microprocessor may be sufficient to execute the transaction without the ATM prompting the user for additional data. The ATM may dispense the requested amount of cash to the user without requiring the user to enter any information at the ATM after inserting the smart card into the ATM.

The smart card may encrypt data entered by the user. The ATM may decrypt data it receives from the smart card. The smart card may encrypt all data entered by the user via the keypad. The smart card may encrypt less than all of the data associated with a set of transaction instructions. For example, the smart card may only encrypt a PIN or other authentication information.

Limiting the amount of data encrypted by the smart card may allow the smart card to use less power to function. Using less power may improve the functionality of the smart card by extending its battery life and extending the amount of time between charging.

Limiting the amount of data encrypted by the smart card may improve functionality of the ATM. The ATM may only need to decrypt selected data and rot an entire set of transaction instructions. This may speed up a response time of the ATM when processing transactions instructions received from eh smart card. Limiting the amount of data that needs to be decrypted by the ATM may further increase the transaction processing efficiency of the ATM per unit of time.

The microprocessor may be configured to delete data from the smart card after expiration of a pre-determined time period. For example, the microprocessor may be configured to delete transaction instructions or authentication information stored on the smart card after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor may not capture data entered using the keypad.

The keypad may have an active state. In the active state, the keypad may be capable of capturing data entered by a user. In the active state, the microprocessor may supply power to the keypad. In the active state, the microprocessor may capture and/or encrypt data entered by the user using the keypad.

The inactive state of the keypad may be a default state. When the keypad is in the inactive state, data entered using the keypad of the smart card is not captured by the microprocessor. The microprocessor may toggle the keypad between the inactive and active states. For example, the microprocessor may activate the keypad in response to establishing a communication channel with an ATM.

A system for increasing transaction processing efficiency of an Automated Teller Machine ("ATM") is provided. The system may include a smart card having a thickness not greater than 0.8 mm. The smart card may have a width not greater than 54 mm. The smart card may have a length not greater than 86 mm.

The system may include a communication interface. The communication interface may be embedded in the smart card. The communication interface may include hardware and software for communicating with an ATM. For example, the smart card may include circuitry for communicating over Wi-Fi, NFC, Bluetooth, cellular, satellite any suitable wireless network or protocol. The communication interface may include a wired communication interface. For example, the smart card may include circuitry and externally accessible electrical contact (s) for communicating over a wired Ethernet or any suitable wired network or protocol.

The system may include microprocessor. The microprocessor may be embedded in the smart card. The microprocessor may control communication conducting using the communication interface. For example, the microprocessor may initiate communication with an ATM using the communication interface. The microprocessor may terminate communication with the ATM by turning off the communication interface. Turning off the communication interface may include disconnecting from the ATM. Turning off the communication interface may include terminating communication channel with the ATM. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the ATM. The executable instructions, when run by the microprocessor, may self-authenticate a user or the smart card. The self-authentication may be conducted over a communication channel established using the communication interface. The communication channel may be a secure communication linking the smart card and the ATM.

The executable instructions, when run by the microprocessor on the smart card may formulate transaction instructions executable by the ATM. The transaction instructions may be formulated based on the data stored on the smart card. Transaction instructions may be formulated before a secure communication channel is established between the smart card and the ATM. For example, a user of the smart card may enter data using the keypad when the user is at home. While at home, the smart card may not be within a communication range of an ATM.

Formulated transaction instructions may be transferred to an ATM over a secure communication channel linking the smart card and the ATM. An ATM may only establish a secure communication link with the smart card when the smart card is within a threshold distance of the ATM. When the smart card is within the threshold distance, the smart card may be likely or expected to access the ATM. In some embodiments, the secure communication link may only be established when the user initiates a request to establish the secure communication link.

Transaction information or instructions stored locally on the smart card may be used to stage a transaction at the ATM. A staged transaction may include all data needed to execute a transaction at the ATM without requiring further input from a user. For example, for a withdrawal transaction, the transaction instructions may include transaction/authentication information such as a PIN, the amount to be withdrawn and the account funds are to be withdrawn from.

When the ATM receives the transaction instructions, the ATM may verify that the PIN is associated with the account. The ATM may also verify that the account includes sufficient funds to fulfill the withdrawal request. After conducting the verification, the ATM may execute the transaction instructions. The user of the smart card may not need to input any additional information after the transaction information/instructions are transferred to the ATM.

In some embodiments, after conducting the verification of the PIN and sufficient funds, the ATM may await confirmation from the user before executing the transaction. For example, the ATM may receive the transaction instructions over a wireless communication channel. The ATM may receive transaction instructions over the wireless communication when the smart card is outside a threshold distance from the ATM. The user of the smart card may enter data used to formulate the transaction instructions when the user is at home or at work. The transaction instructions may be transmitted to the ATM over a Wi-Fi or cellular communication channel.

Transaction instructions may be transmitted from the smart card to a target ATM. The transaction instructions may be transmitted to a cloud computer system. When the smart card establishes a wired or wireless connection to the ATM, the ATM may check whether transaction instructions associated with the smart card are stored on the ATM or in the cloud computing system.

In some embodiments, after storing transaction instructions locally on the smart card, a flag may be set on the smart card. The ATM may be configured to check the flag and determine whether transaction instructions have been formulated by the smart card.

In some embodiments, the ATM may require authentication before establishing a connection with the smart card. For example, the ATM may require entry of the PIN or submission of a biometric feature before executing transaction instructions received from the smart card. Executing transaction instructions received from the smart card may reduce the number of user inputs required at the ATM. Reducing the number of user inputs at the ATM improves the transaction processing efficiency of the ATM.

The microprocessor may configure the smart card to purge transaction instructions when an ATM does not establish a wired or contact-based communication channel with the smart card within a pre-determined time period. A cloud computing system may receive transaction instructions at a first time. When an ATM accessible to the cloud computing system does not establish a connection to the smart card by a second time, the cloud computing system may purge the received transaction instructions.

In some embodiments, the interval between the first and second times may be set by the cloud computing system. The cloud computing system may assign a default interval to transaction instructions received from the smart card. The cloud computing system may assign a longer or shorter time interval based on a distance between a current location of the smart card transmitting the transaction instructions and a location of an ATM. The system may use a machine leaning algorithm to determine an interval that provides sufficient time for the smart card user to travel to and access the ATM.

The machine learning algorithm may take account of traffic patterns, time of day and typical user behavior. For example, if transaction instructions are received closer to the end of a workday, the interval may be shorter than if the transactions instructions are received earlier in the workday.

The system may include a front controller. The front controller may be included in the ATM. Using an ATM communication channel, the front controller may receive encrypted input data from the smart card via the communication interface. The encrypted data may include transaction instructions. Transaction instructions may be received by the front controller from a cloud computing system.

The system may include a decryption controller. The decryption controller may be included in the ATM. The decryption controller may decrypt encrypted data received by the ATM from the smart card.

The system may include an input validation controller. The input validation controller may communicate with a remote computer server. The remote computer serer may be a cloud computing system. The remote computer server may validate encrypted data received from the smart card. Validating the encrypted data may include verifying whether transaction instructions received from the smart card are associated with a valid PIN or other valid authentication information. Validating the encrypted data may include verifying whether transaction instructions are associated with sufficient funds for a specified transaction or account.

The system may include a payment dispatcher. The payment dispatcher may be included in the ATM. The payment dispatcher may dispense cash or other items in response to a positive validation received from the input validation controller.

The smart card may include a wireless communication interface. The microprocessor may instruct the wireless communication interface to scan for a wireless ATM communication channel. A wireless ATM communication channel may only be detectable when the smart card is within a threshold distance of an ATM. For example, the ATM wireless communication channel may be purposefully configured to have a maximum transmission range that is limited to a threshold distance from the ATM. An illustrative distance may an NFC communication range.

In response to detecting the wireless ATM communication channel, the smart card may transfer transaction instructions the ATM over the wireless ATM communication channel. The ATM may pre-stage a transaction based on received encrypted transaction instructions. The ATM may execute the pre-staged transaction only after establishing contact-based communication with the smart card.

The microprocessor may purge encrypted data stored on the smart card when contact-based communication with the ATM is not established within a pre-determined time period. The ATM may purge transaction instructions received from the smart card when contact-based communication is not established with the smart card within a pre-determined time period.

Apparatus for a smart card that improves transaction processing efficiency of an ATM is provided. The smart card may include a touch-sensitive screen. The touch-sensitive screen may capture a user's finger motions across a surface of the touch-sensitive screen. A user's finger motions may be used to enter data (e.g., transaction and authentication information) into the smart card. The user may handwrite authentication and transaction information on the touch-sensitive screen.

The microprocessor may capture finger motions entered using the touch-sensitive screen. The smart card may include specialized software (executable by the microprocessor) for automatic conversion of finger motions and handwriting as they are input by the user on the touch-sensitive screen into authentication and transaction information.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to register a touch input. Resistive-touch technology is also relatively less expensive than other touch sensing technologies.

The touch-sensitive screen may utilize capacitive touch technology to detect user touch inputs. Screens constructed using capacitive touch technology may identify where on the touch-sensitive screen a user touches based on detecting an electrical signal created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection or acoustic pulse recognition technologies.

The smart card may include a touch-sensing controller for detecting a touched location on the touch-sensitive screen. The touch-sensing controller may include an application-specific integrated circuit ("ASIC") chip and a digital signal processor ("DSP") chip.

In some embodiments, the touch-sensitive screen may provide "single-touch" functionality. Single-touch functionality may detect input from a single user touch on the touch-sensitive screen. For example, the touch-sensitive screen may display a list of transaction options and the user may select one of the displayed options by using a finger to touch the desired option. Single-touch functionality may also recognize double finger taps or a long-press functionality.

In some embodiments, the touch-sensitive screen may provide "multi-touch" functionality. Multi-touch functionality may detect input from two or more simultaneous user touch points on the touch-sensitive screen. For example, a pinch-to-zoom feature is a multi-touch functionality.

The touch-sensitive screen may include organic light emitting diode ("OLED") technology. The OLED display may have a thickness that is not greater than 0.25 mm. OLEDs may be flexible. The microprocessor may configure the OLED display to present a label describing a transaction assigned to the special purpose key.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The smart card may include a haptic response system. The haptic response system may provide a responsive force, vibration or movement in response to receiving a user's touch input. For the example, the haptic response system may provide a responsive vibration to a user's touch-based selection of a displayed option. The haptic response system may include an eccentric (unbalanced) rotating mass, a linear resonant actuator, a piezoelectric actuator or any other suitable hardware for generating a haptic response.

The microprocessor and associated hardware may interpret finger motions and handwriting of the user applied to the touch-sensitive screen. For example, the microprocessor may translate the user's finger motions into digital transaction information. The microprocessor may translate the user's finger motions into digital authentication information. The microprocessor may translate the user's finger motions into digital transaction instructions. The microprocessor may encrypt the captured finger motions.

The microprocessor may formulate a set of transaction instructions executable by the ATM based on the captured finger motions. The microprocessor may formulate a set of transaction instructions executable by the ATM based on a user's touch-based selection of options displayed on the touch-sensitive screen. The user may provide touch-based confirmation of the accuracy of transaction instructions formulated by the microprocessor.

In response to establishing a communication channel with an ATM, using the communication interface, the microprocessor may transfer formulated transaction instructions to the ATM. The transaction instructions, when received by the ATM, may autonomously trigger a transaction at the ATM. Autonomously initiating a transaction includes initiating a transaction at the ATM without the ATM prompting the user for any additional data. Autonomously triggering of transactions at the ATM may not require prompting for or waiting to receive, user inputs at the ATM. Autonomously triggering a transaction at the ATM may therefore improve the transaction processing efficiency of the ATM by avoiding delays associated with the ATM prompting for and, waiting to receive responses to, user inputs.

Illustrative finger motions entered using the touch-sensitive screen and encrypted by the microprocessor may include a personal identification number ("PIN") associated with the smart card, an amount of cash desired to be withdrawn from the ATM and an account the user desires to withdraw the cash from.

The communication interface may include a wireless communication circuit. The microprocessor may transfer transaction instructions to an ATM in response to establishing a wireless communication channel with the ATM. The transfer of transaction instructions to the ATM may initiate a transaction at the ATM. The microprocessor may require a touch-based confirmation from the user before transmitting transaction instructions to the ATM. The touch-based confirmation may include the screen displaying a confirmatory message and requiring the user to register confirmation by touching a target area of the screen.

In some embodiments, the smart card may include a fingerprint reader embedded within, or underneath the touch-sensitive screen. The user may register confirmation of transaction instructions by providing a fingerprint using the embedded fingerprint reader. The microprocessor may confirm whether the provided fingerprint matches a known fingerprint securely stored locally on the smart card. The microprocessor may display the target area (that needs to be touched to confirm transaction instructions) overlaid above the embedded fingerprint reader. By pressing a finger against the target area, the user may register confirmation by touching the target area of the screen and simultaneously submit a fingerprint for verification.

In some embodiments, the smart card may include an electrical contact. The microprocessor may only transfer transaction instructions to the ATM and thereby initiate a transaction at the ATM in response to establishing a contact-based communication channel with the ATM. Establishing a contact-based communication channel with the ATM may ensure the user is physically present at the ATM. A battery of the smart card maybe recharged via the at least one electrical contact when the smart card is in contact-based communication with the ATM.

The touch-sensitive screen may have an inactive state. In the inactive state, the touch-sensitive screen is unable to capture data such as a user's touch inputs or handwriting. When the touch-sensitive screen is in the inactive state, touch inputs including finger motions applied to the touch-sensitive screen are not captured by the microprocessor.

The touch-sensitive screen may have an active state. In the active state, the touch-sensitive screen is capable of capturing data, such as a user's touch inputs and handwriting. The inactive state may be a default state of the touch-sensitive screen. A default inactive state may prevent the microprocessor from capturing inadvertent touch inputs.

The microprocessor may toggle the touch-sensitive screen from the inactive state to the active state. The microprocessor may toggle the touch-sensitive screen from the active state to the inactive state. For example, the microprocessor may toggle the touch-sensitive screen from the inactive state to the active state in response to establishing a communication channel with the ATM.

The smart card may include a touch-sensitive screen and, a keypad. The keypad may be a mechanical keypad. In such embodiments, the housing and the keypad collectively may have a thickness that is not greater than 0.8 mm.

In some embodiments, the smart card may only include a touch-sensitive screen. The touch-sensitive screen may be configured to display a virtual keypad. The virtual keypad may include a display of input buttons that may be touch-selected by the user. In such embodiments, the housing and the touch-sensitive screen collectively may have a thickness that is not greater than 0.8 mm.

A system for improving transaction processing efficiency of an ATM is provided. The system may include a smart card having a thickness not greater than 0.8 mm and a surface area not greater than 86 mm×54 mm. The smart card may include hardware components such as a communication interface and a microprocessor. The smart card may include a user input system in electronic communication with the microprocessor. The user input system may include a touch-sensitive screen and an input controller. The input controller may capture a user's touch inputs applied to the touch-sensitive screen.

The smart card may include a voice controller. The voice controller may generate an audio message confirming the microprocessor's interpretation of the user's touch inputs applied to the touch-sensitive screen and captured by the input controller. The microprocessor may prompt the user to touch a target area of the screen to confirm an accuracy of the generated audio message. In response to receiving the user's confirmation, the microprocessor may generate transaction instructions for executing a transaction identified in the audio message.

The smart card may include an encryption controller. The encryption controller may encrypt data captured by the input controller. The encryption controller may encrypt the transaction instructions formulated by the microprocessor.

The smart card may include executable instructions stored in a non-transitory memory. The executable instructions, when run by the microprocessor may self-authenticate the smart card over the ATM communication channel. Self-authentication may include providing an ATM with authentication credentials stored locally on the smart card. The self-authentication process may not prompt the user or require any input from the user. Authentication credentials may include a PIN or a biometric feature. The authentication credentials may be provided by the user during a process of entering transaction information.

In some embodiments, the user may be required to enter authentication credentials each time information for a new transaction is entered using the touch-sensitive screen. In some embodiments, the smart card may only require the user to enter authentication credentials occasionally, such as after expiration of a pre-determined time period. The ATM may be configured to verify authentication credentials provided by the smart card before executing transaction instructions received from the smart card.

The smart card may establish a secure communication link with the ATM using the communication interface. The smart card may transfer the formulated (and confirmed) transaction instructions to the ATM over the secure communication link. Transfer of the transaction instructions to the ATM may stage a transaction at the ATM.

Staging a transaction may refer to a transaction that does not require any additional transaction information from the user to be executed by the ATM. For example, all details of the transaction may be included in the transaction instructions. In some embodiments, the ATM may require user confirmation before executing the staged transaction. Confirmation at the ATM may verify that user is physically present at the ATM before executing the staged transaction. Staging transactions at an ATM improve transaction processing efficiency of the ATM by avoiding delays associated with the ATM prompting for and, waiting to receive responses to, requests for additional transaction information.

The smart card may include a touch-sensitive screen and a mechanical keypad. The encryption controller may encrypt data captured by the mechanical keypad. The mechanical keypad may not enlarge the thickness or surface area of the smart card. For example, the thickness of the smart card, including the mechanical keypad may be 0.8 mm.

The microprocessor may store first transaction instructions and second transaction instructions locally on the smart card. The microprocessor may stage a first transaction at a first ATM by transmitting the first transaction instructions to the first ATM. The microprocessor may stage the second transaction at a second ATM by transmitting the second transaction instructions to the second ATM. The microprocessor may stage the second transaction at the second ATM after the first transaction is executed by the first ATM.

The microprocessor may purge or delete transaction instructions from the smart card when the smart card does not establish contact-based communication channel with the ATM within a pre-determined time period. For example, if the first transaction instructions are not executed by the second ATM with a pre-determined time period, the second transaction instructions may be deleted from the smart card.

Methods for improving transaction processing efficiency of an ATM are provided. Methods may include capturing transaction information using a touch-sensitive screen embedded in a smart card. The touch-sensitive screen may display transaction information that may be selected by a user of the smart card. The user may touch displayed transaction information select information for a desired transaction.

The user may enter custom transaction information. For example, using touch inputs, the user may instruct the microprocessor to display a virtual keypad on the touch-sensitive screen. The user may the touch displayed virtual keys to enter customized transaction information. The user may also apply touch inputs to navigate menus displaying transaction options or information that may be selected by the user.

For example, a menu displayed on the touch-sensitive screen may present common transactions that may be touch-selected by the user. Common transactions may be determined based on a transaction history of the user. Common transactions may be determined based on a transaction history of a plurality of ATM users.

Based on the transaction information touched (e.g., selected) by the user, the microprocessor may formulate transaction instructions. For example, the microprocessor may capture transaction information when a user applies touch-inputs to the touch-sensitive screen. The microprocessor may capture transaction information by associating the user's touch inputs with an instance of transaction information displayed on the touch-sensitive screen at a time the user applies a touch input the screen. The microprocessor may capture transaction information by translating finger motions or handwriting (as applied to the touch-sensitive screen) into digital transaction information and instructions.

Methods may include encrypting captured transaction information or instructions. Methods may include staging a transaction at the ATM based on the captured transaction information or instructions. The transaction may be staged at the ATM by transmitting the transaction instructions formulated by the microprocessor to the ATM. A staged transaction may refer to a transaction that does not require any additional transaction information from a user to be executed by the ATM.

For example, all details of the transaction may be included in the transaction instructions. The ATM may require user confirmation before executing the staged transaction. Confirmation at the ATM may verify that user is physically present at the ATM before executing the staged transaction. Staging transactions at the ATM improve the transaction processing efficiency of the ATM by avoiding delays associated with the ATM prompting for and, waiting to receive responses to, requests for additional transaction information.

Methods may include storing transaction information locally on the smart card. Methods may include formulating executable transaction instructions based on transaction information stored locally on the smart card. Methods may include storing transaction instructions locally on the smart card.

Methods may include transferring transaction instructions from the smart card to the ATM. Methods may include transferring transaction instructions from the smart card to the ATM using a contact-based communication channel or a wireless communication channel. Methods may include, at the ATM, executing the transaction instructions without receiving any input from a user of the smart card after transferring the transaction instructions from the smart, card to the ATM.

Methods may include using the touch sensitive screen to present visual confirmation of captured transaction information and/or transaction instructions. Methods may include determining whether the user has applied a touch input that confirms the presented information or instructions. Methods may include determining whether the user has applied a touch input that rejects the presented information or instructions. In response to a rejection of the presented transaction information/instruction, methods may include, using the touch sensitive screen selecting alternative transaction options from a drop-down list or menu.

Methods for improving transaction processing efficiency of an Automated Teller Machine ("ATM") are provided. Methods may include capturing transaction information using a keypad embedded in a smart card. Methods may include formulating, transaction instructions based on the transaction information captured via the keypad.

Methods may include encrypting the transaction information. Methods may include storing the encrypted transaction information locally on the smart card. Methods may include encrypting the transaction instructions formulated based on the transaction instructions. Methods may include storing the encrypted transaction instructions locally on the smart card.

Methods may include transferring the encrypted transaction instructions from the smart card to an ATM. Methods may include formulating a staged transaction at the ATM based on the encrypted transaction information. The staged transaction may include information needed for the ATM to execute a transaction autonomously, without requiring additional user input. Methods may include executing the staged transaction without receiving any input from a user of the smart card after transferring the encrypted transaction instructions from the smart card to the ATM.

In some embodiments, the smart card may encrypt transaction information entered by a user. Methods may include providing audio confirmation to the user of the smart card. The audio confirmation may provide an audible articulation of the encrypted transaction information/instructions stored locally on the smart card.

Methods may include transferring transaction information/instructions from the smart card to the ATM using a contact-based communication channel. Methods may include transferring the encrypted transaction information/ instructions from the smart card to the ATM using a wireless communication channel. The smart card may transmit the encrypted transaction information to the ATM. The ATM may formulate the transaction instructions based on the encrypted transaction information.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes touch-sensitive screen 105. Touch-sensitive screen 105 may display information, such as virtual keypad 119. User 117 may touch displayed virtual keys to select and input transaction information.

Touch-sensitive screen 105 also includes area 107. User 117 may use finger motions, applied against touch-sensitive screen 105, to enter transaction information. A microcontroller of smart card 100 may interpret finger motions of user 117.

Area 107 shows that using finger motions, user 117 has hand-written "W/D $100 Accnt 1234." A microprocessor of smart card 100 may interpret the hand-written message as transaction information indicating that user 117 wishes to withdraw $100 from an account having a number ending in 1234.

Using touch inputs, user 117 may enter a currency of the funds or the currency may be automatically assigned based on a location of smart card 100. In some embodiments, touch-sensitive screen 105 may display virtual denomination keys that may be touched by user 117 to enter the currency of the desired funds. Illustrative currencies may include appropriate symbols for dollars ($), euros (€), yen (¥), pounds (£) or any suitable currency.

Other illustrative information that may be entered by user 117 using touch inputs applied to touch-sensitive screen 105 may include a time or a time window when user 117 would like to withdraw the cash from an ATM. User 117 may also enter a specific ATM for withdrawing the cash from.

For example, user 117 may also enter "1530." This information may represent that user 117 wishes to withdraw the $100 after 2:30 pm. When user 117 specifies a time, an ATM may not allow withdrawal of the $100 before 2:30 pm. In some embodiments, user 117 may not specify a time. Not specifying a time may indicate that user 117 wishes to withdraw the funds at any time.

In some embodiments, user 117 may enter a time window. For example, the user may enter "1530-1430." This may indicate that user 117 only authorizes staged withdrawal of the $100 between 2:30 pm and 4:30 pm. An ATM may not allow withdrawal of $100 before 2:30 pm. The ATM may not allow execution of the staged withdrawal of $100 after 4:30 pm. For example, smart card 100 may purge the entered transaction information after 4:30 pm. Smart card 100 may not transfer the transaction information/instructions to an ATM before 2:30 pm or after 4:30 pm. Smart card 100 may also purge transaction information/instructions after they have been transferred to an ATM.

FIG. 1 shows that smart card 100 includes chip 101. Chip 101 may provide an electrical contact that is accessible through housing 102. Chip 101 may provide an electrical contact for establishing a wired or contact based communication channel with an ATM when card 100 is inserted into a card reader of the ATM. Chip 101 may be an EMIT chip.

Chip 101 may store a copy of information printed on a face of smart card 100. For example, chip 101 may store card number 109, username 115, expiration date 113 and issuing bank 111. Chip 101 may also store encrypted security information. The encrypted security information may be utilized to provide a "second factor" method of authentication prior to executing a staged transaction.

For example, smart card 100 may package information entered by user 117 via touch-sensitive screen 105 into transaction instructions. The transaction instructions may include a PIN associated with smart card 100. The transaction instructions may be executable by an ATM without requiring any additional inputs from user 117. The transaction instructions may be transferred to the ATM using wireless circuitry 103. In some embodiments, the transaction instructions may be transferred via a contact-based connection using chip 101.

After an ATM receives transaction instructions from smart card 100, the ATM may first determine whether the PIN included in the transaction instructions is associated with smart card 100. For example, the ATM may communicate with a remote server and determine whether the received PIN is associated with username 115 and/or card number 109.

As a second factor method of authentication, the ATM may determine whether the PIN included in the transaction instructions (and transferred to the ATM) successfully unlocks encrypted security information stored on chip 101. If the PIN successfully unlocks the encrypted security information, the ATM may autonomously execute the staged transaction instructions.

FIG. 1 also shows that smart card 100 has width w and length 1. Smart card 100 may be any suitable size. For example, width w may be 53.98 millimeters ("mm"). Length 1 may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of an ATM.

Figure 2:
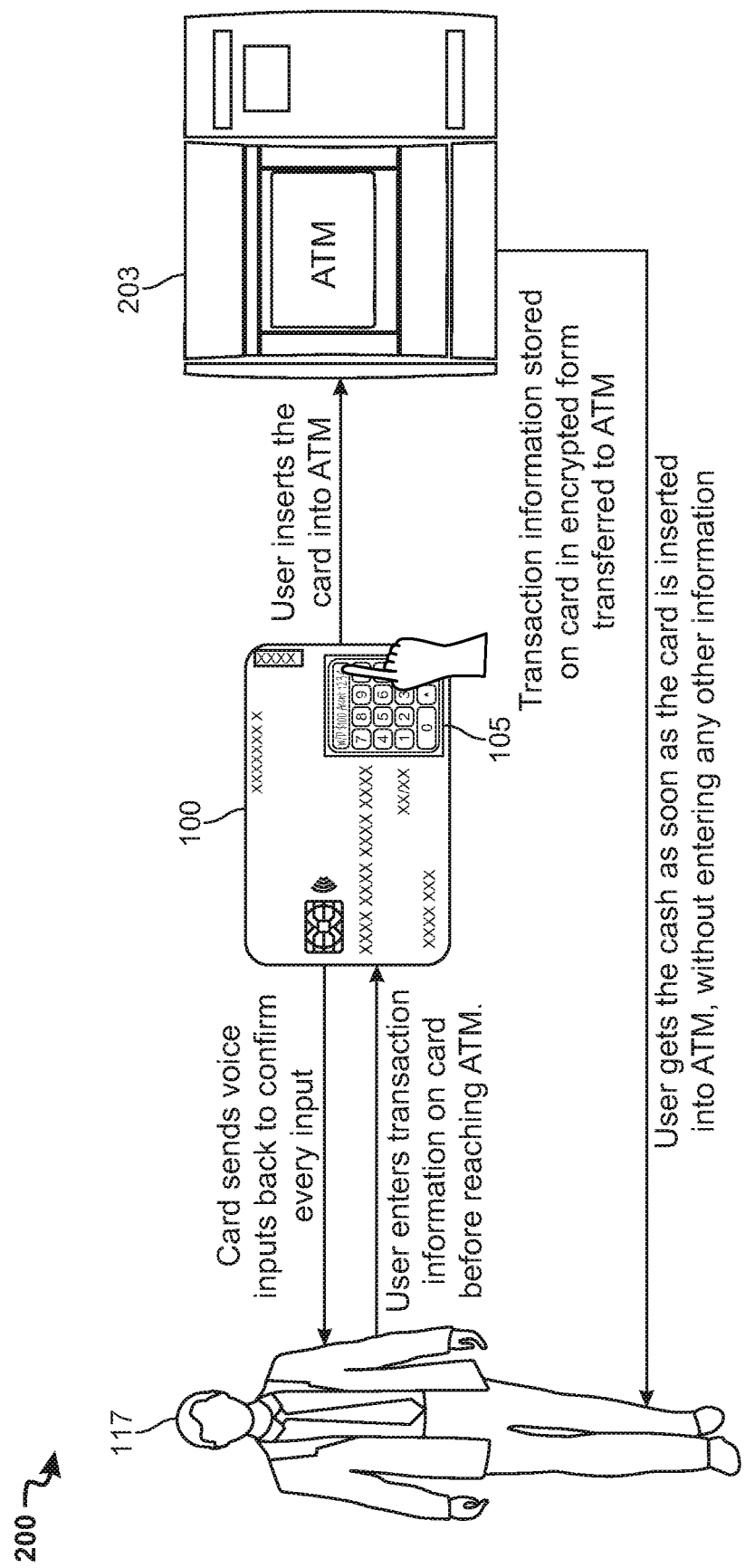
FIG. 2 shows an illustrative apparatus and process in accordance with principles of the disclosure.

FIG. 2 shows illustrative scenario 200. In scenario 200, using touch-sensitive screen 105, user 117 enters touch inputs corresponding to a withdrawal amount and source account for the withdrawal. The information entered by user 117 may be encrypted and stored locally on smart card 100. Smart card 100 may include a speaker (not shown). The speaker may provide user 117 with audio confirmation of transaction information entered using touch-sensitive screen 105. For example, the speaker may provide audio confirmation of the entered amount. In some embodiments, to maintain secrecy, the speaker may not provide audio confirmation of a PIN or account number.

After entering the amount, PIN, account and any other transaction information, the transaction information is encrypted and stored locally on smart card 100. Smart card 100 may include a specially designed memory location for securely storing transaction information.

In some embodiments, transaction information stored locally on smart card 100 may be transferred to ATM 203. ATM 203 may formulate transaction instructions based on the transaction information received from smart card 100. In some embodiments, a microprocessor on smart card 100 may be configured to formulate the transaction instructions executable by ATM 203 based on the transaction information. No external hardware or software such as a mobile device, laptop or desktop device is needed to formulate the transaction instructions. The transaction instructions may also be encrypted and securely stored locally on smart card 100.

The microprocessor of smart card 100 may also purge any locally stored transaction information or instructions that have not been transferred to ATM 203 within a predetermined time window. Transaction information or instructions may be transferred to ATM 203 when smart card 100 is inserted into a card reader (not shown) of ATM 203. Transaction information or instructions may be transferred to ATM 203 when smart card 100 is within a target distance of ATM 203. Smart card 100 may include circuity for conducting NFC communication. The target distance may correspond to smart card 100 being within range for conducting NFC communication. A typical NEC range is ~2 in.

In other embodiments, the microprocessor of smart card 100 may be configured to dynamically limit or expand wireless transmitting and receiving ranges. The microprocessor may dynamically limit or expand wireless transmitting and receiving ranges in response to detected location of smart card 100.

Smart card 100 may include a global positioning system ("GPS") chip for receiving and/or transmitting GPS signals. The microprocessor of smart card 100 may determine a current location of the smart card based on the received GPS signals. In other embodiments, the microprocessor of smart card 100 may determine a current location of the smart card based on signal triangulation techniques or information received from an ATM.

After transaction information or instructions stored locally on smart card 100 are transferred to ATM 203, ATM 203 executes the transaction based on the received transaction information or instructions. FIG. 2 shows that for a withdrawal transaction, ATM 203 provides user 117 with the requested amount of cash when smart card 100 is inserted or otherwise establishes communication with ATM 203. ATM 203 does not prompt user 117 for any transaction information to execute the withdrawal transaction. The process and apparatus shown in FIG. 2 will increase transaction efficiency of ATM 203 by allowing ATM 203 to process more transactions per unit of time.

Figure 3:
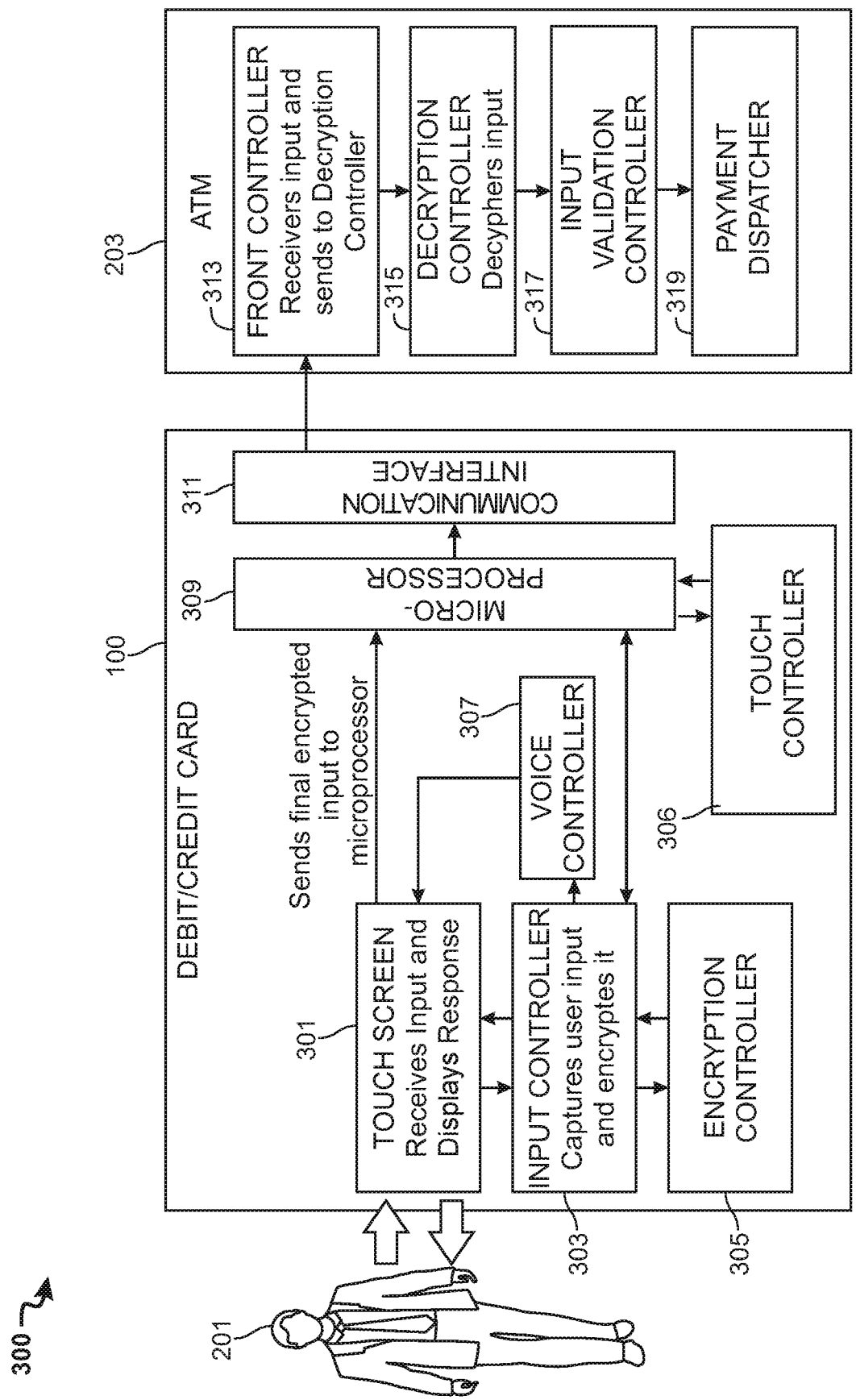
FIG. 3 shows an illustrative apparatus and process in accordance with principles of the disclosure.

FIG. 3 shows illustrative components 300 or smart card 100 (shown in FIG. 1) and ATM 203 (shown in. FIG. 2).

FIG. 3 shows that smart card 100 includes touch-sensitive screen 301. Smart card 100 may include a speaker (not shown) for receiving input and providing output to user 203. The speaker may be controller by voice controller 307. Voice controller 307 may receive instructions from input controller 303.

Input controller 303 may capture touch inputs provided by user 117 using touch-sensitive screen 301. Input controller 303 may encrypt the captured data. Input controller 303 may store captured data locally on smart card 100. Voice controller 307 may generate electrical impulses that when received by the speaker, audibly convey interpretation of touch inputs captured by input controller 303 to user 117.

In some embodiments, input controller 303 may include specialized software for performing analysis of handwritten user inputs. Input controller 303 may convert handwritten text into digital transaction information.

Encryption of data captured by input controller 303 may be performed by encryption controller 305. Encryption controller 305 may encrypt the data using any suitable encryption algorithm. Illustrative encryption algorithms include RSA cryptography, Blowfish, AES, RC4, RC5, and RC6.

Smart card 100 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very similar. The reduced number of encryption rounds is offset by the relatively long 64 bit key.

Microprocessor 309 may control overall operation of smart card 100 and its associated components. For example, microprocessor 309 may activate or deactivate touch-sensitive screen 301. When touch-sensitive screen 301 is active, input controller 303 may capture and encrypt touch inputs. When touch-sensitive screen 301 is inactive, input controller 303 may not receive touch data from touch-sensitive screen 301. For example, in the inactive state, power may not be supplied to touch-sensitive screen 301.

In some embodiments, microcontroller 309 may activate or deactivate input controller 303. When active, input controller 303 may capture and encrypt touch inputs received from touch-sensitive screen 301. When inactive, input controller 303 may disregard touch inputs received from touch-sensitive screen 301.

Microcontroller 309 may activate or deactivate any component of smart card 100. Based on detecting a communication channel associated with ATM 203, microprocessor may activate one or more components of smart card 100. Microprocessor 309 may activate or deactivate components of smart card 100 based on a location of smart card 100.

For example, microprocessor 309 may only activate touch-sensitive screen 301 or input controller 303 when smart card 100 is in a familiar zone. User 117 may define a familiar zone by inputting a zip code using touch-sensitive screen 301. Microcontroller 309 may deactivate touch-sensitive screen 301 or input controller 303 when smart card 100 is in an unknown zone. Smart card 100 may include a GPS chip for detecting a current location.

Touch controller 306 may include hardware and software for controlling the capture and display of information on touch-sensitive screen 301. Touch controller 306 may detect touch inputs. For example, touch controller 306 may detect a single touch input, a long-press or handwritten text.

Smart card 100 also includes communication interface 311. Communication interface 311 may include a network interface or adapter. Communication interface 311 may include hardware and/or software for establishing a communication channel with ATM 203. Communication interface 311 may be configured to implement protocols for wireless and/or wired communication with ATM 203.

FIG. 3 also shows illustrative components of ATM 203. ATM 203 includes front controller 313. Front controller 313 communicates with smart card 100 via communication interface 311.

Front controller 313 may include a network interface or adapter. Front controller 313 may include hardware and/or software for establishing a communication channel with smart card 100. Front controller 313 may be configured to implement protocols for wireless and/or wired communication with smart card 100.

Front controller 313 may receive transaction information and instructions transmitted stored on smart card 101 via ATM interface 311. Front controller 313 may establish a wired or contact based connection with smart card 101. For example, Front controller 313 may establish a wireless connection with smart card 101. For example, front controller 313 may include an NFC reader.

Front controller 313 may include a card reader (not shown) for establishing a wireless connection with smart card 101. The card reader may include circuitry for interacting with EMV chip 101 (shown in FIG. 1) of smart card 100. For example, front controller 313 may include one or more read heads. The read head(s) may include a plurality of sub-heads that are positioned to extract information encoded on EMV chip 101. The sub-heads may be positioned based on target chip locations as defined in ISO 7816, which is hereby incorporated herein by reference in its entirety.

ATM 203 includes decryption controller 315. Decryption controller 315 may decrypt transaction information/instructions received from smart card 101. The decrypted transaction information/instructions may be passed to input validation controller 317. Input validation controller 317 may connect to a remote computer server to validate authentication credentials or other information included in the transaction information/instructions received from smart card 100.

For example, input validation controller 317 may validate a PIN associated with user 117 and smart card 101. Input validation controller 317 may validate that an account associated with smart card 101 has an adequate balance to withdraw a requested amount included in the transaction information/instructions.

After input validation controller 317 validates the transaction information/instructions input validation controller 317 may issue instructions to payment dispatcher 319. Payment dispatcher 319 may dispense the amount of cash requested by the transaction information/instructions (received from smart card 100) to user 117. ATM 203 does not require any input from user 117 after establishing communication with smart card 100 and receiving the transaction information/instructions stored on smart card 100.

Figure 4A:
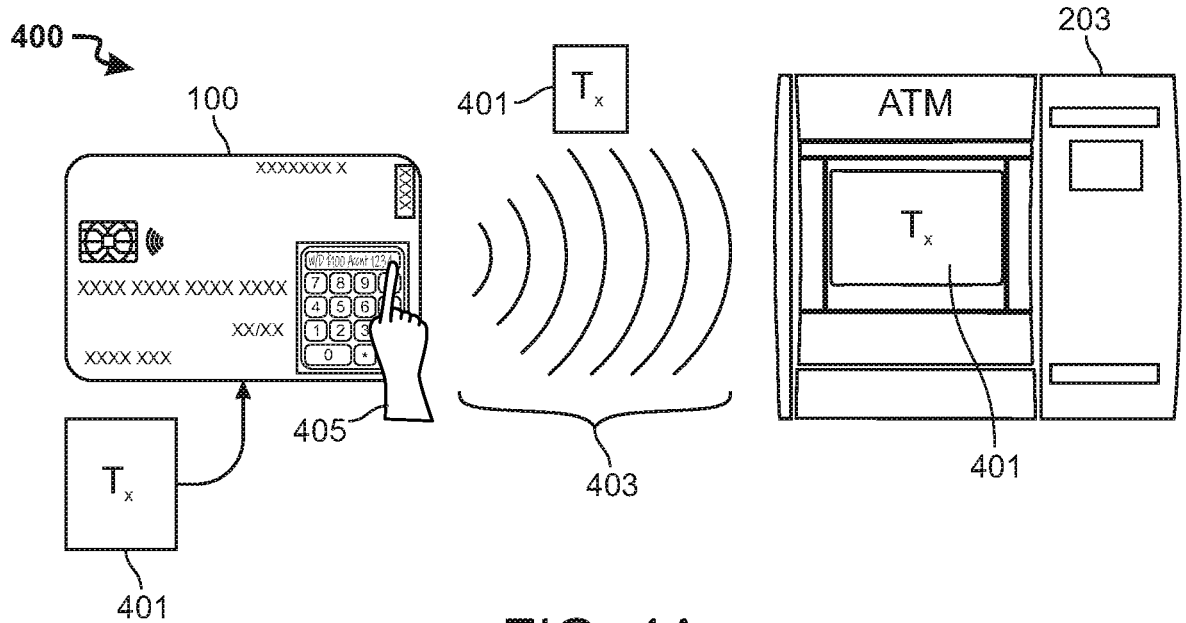
FIG. 4A shows an illustrative apparatus and process in accordance with principles of the disclosure.
Figure 4B:
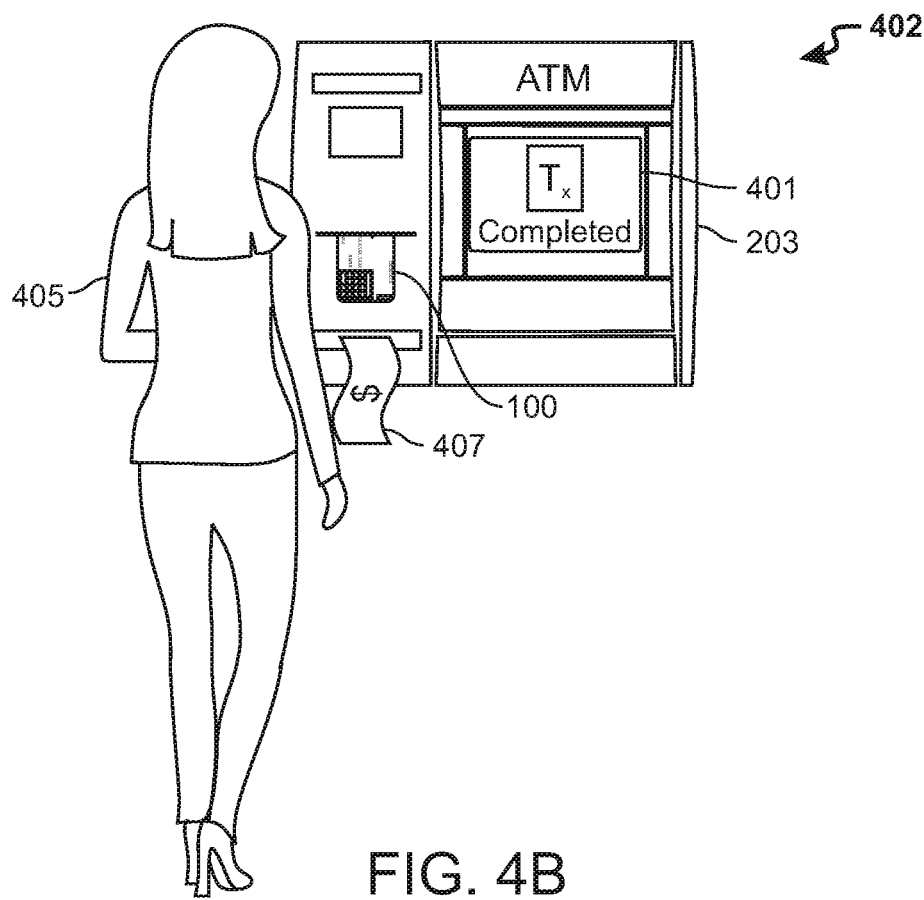
FIG. 4B shows an illustrative apparatus and process in accordance with principles of the disclosure.

FIGS. 4A-4B show illustrative scenarios 400 and 402. In scenario 400, user 405 has utilized touch-sensitive screen 105 of smart card 100 to enter transaction information that is stored locally on smart card 100. Based out touch inputs received from user 405 using touch-sensitive screen 105, smart card 100 may formulate transaction instructions that are executable by ATM 403. Transaction information entered by user 405 may be stored locally on smart card 100 as transaction instructions 401.

Scenario 400 shows that smart card 100 and ATM 203 communicate using communication channel 403. Communication channel 403 may be established when smart card is within a threshold distance of ATM 203. For example, communication channel 403 may be an NFC channel established when smart card 100 and ATM 203 are within an NFC communication range of each other.

In other embodiments, communication channel 403 may be a Wi-Fi communication channel. For example, user 405 may enter transaction information into card 100 from a comfort of their home. User 405 may specify ATM 403 for execution of a transaction. User 405 may pass ATM 403 on the way to or home from work. Using a wireless network at home or work, user 405 may initiate a transfer of transaction instructions 401 to ATM 203. When user 405 inserts smart card 100 into ATM 203, user 405 may trigger execution of the transaction instructions 401 previously transferred to ATM 203.

Transaction instructions 401 are transferred over communication channel 403 to ATM 203. Scenario 400 shows that communication channel 403 is a wireless communication channel. In other embodiments, communication channel may be a wired or contact based communication channel.

FIG. 4B shows scenario 402. In scenario 402, user 405 has inserted smart card 100 into a card reader of ATM 203. As discussed above, user 405 may have transferred transaction instructions 401 specifically to ATM 203 because ATM 203 is at a convenient location.

Transaction instructions 401 may include timing restrictions. The timing restrictions may limit execution of transaction instructions 401 to a time window defined by the timing restrictions. If transaction instructions 401 are not executed within the time window, smart card 100 and/or ATM 203 may delete transaction instructions 401. If transaction instructions 401 are not executed within the time window, smart card 100 may delete transaction instructions 401.

In scenario 402, user 405 inserts smart card 100 into ATM 203. ATM 203 recognizes, based on the information stored on smart card 100, that previously received transaction instructions 401 are associated with smart card 100. ATM 203 may recognize that transaction instructions 401 are associated with smart card 100 based on data encoded in chip 101 or a magnetic stripe (not shown) of smart card 100. In some embodiments, when smart card 100 is inserted into ATM 203, smart card 100 may transfer transaction instructions 401 to ATM 203 for execution.

Scenario 402 shows ATM 203 dispensing cash 407 to user 405. The amount of cash 407 is defined by transaction instructions 401. In scenario 402, ATM 203 dispenses cash 407 to user 405 without user 405 entering any data at ATM 203.

Figure 5A:
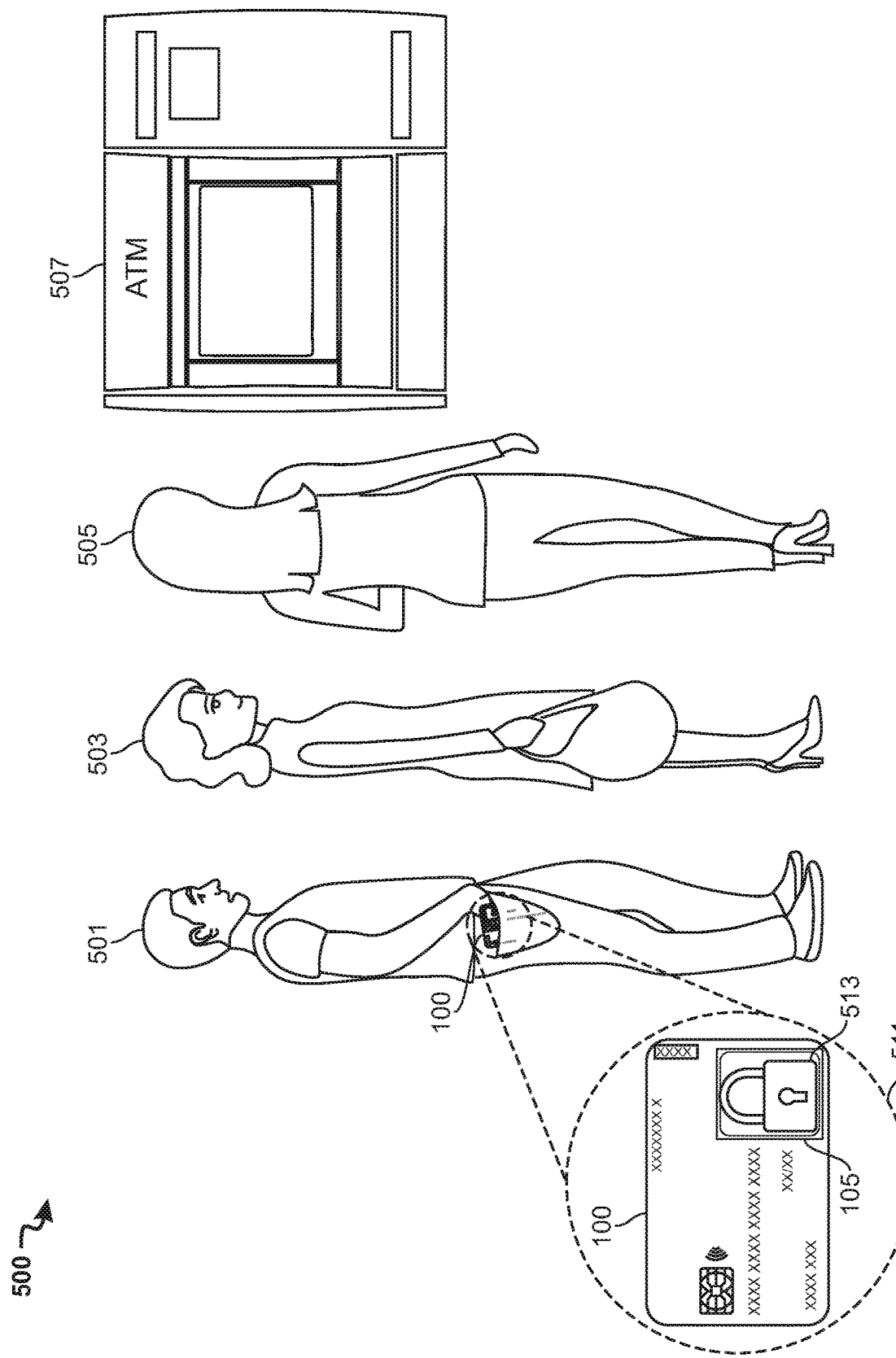
FIG. 5A shows an illustrative apparatus and process in accordance with principles of the disclosure.
Figure 5B:
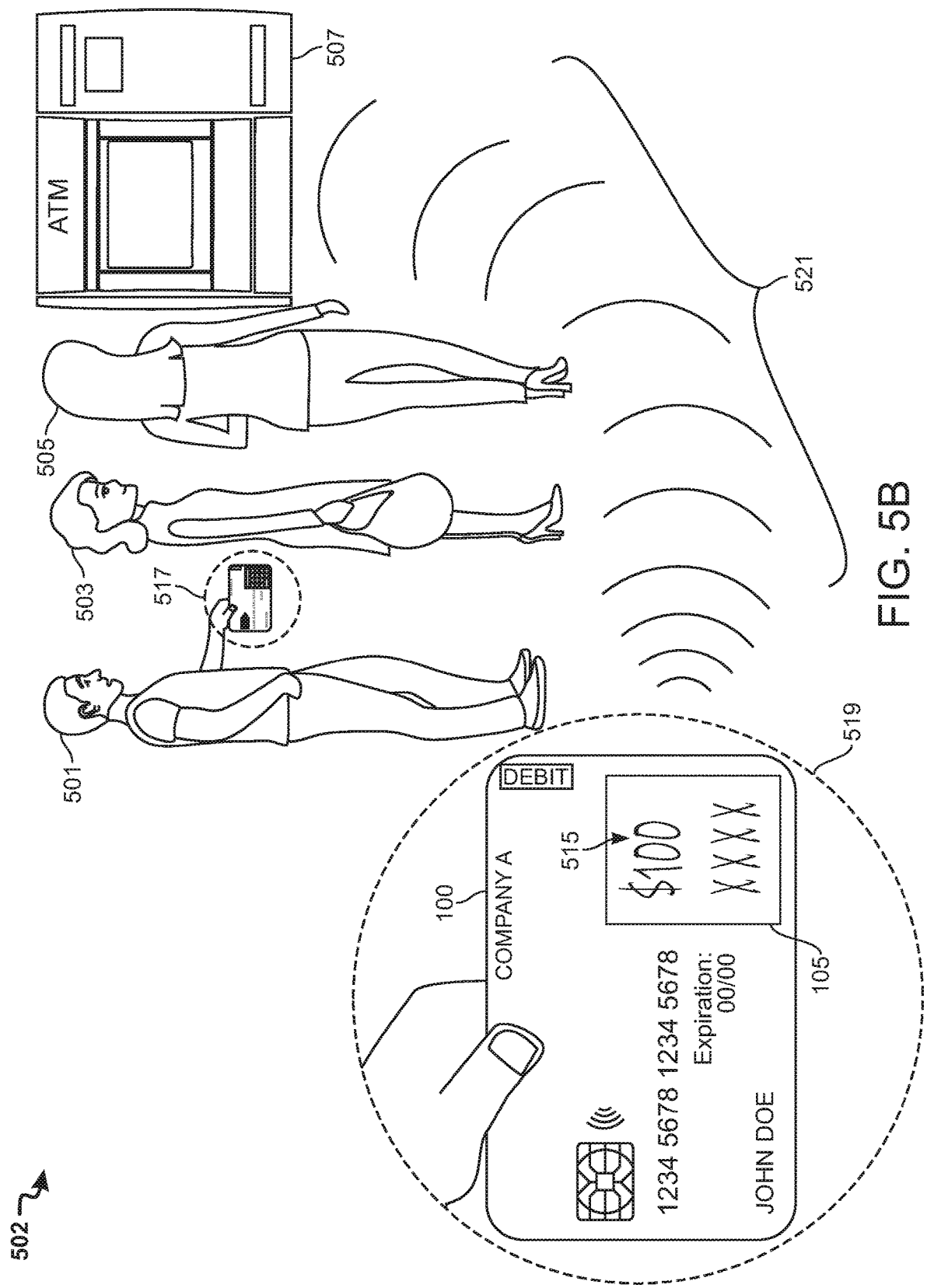
FIG. 5B shows an illustrative apparatus and process in accordance with principles of the disclosure.

FIGS. 5A and 5B show illustrative scenarios 500 and 502. FIG. 5A shows scenario 500. In scenario 500, users 501, 503 and 505 are all waiting on a line to use ATM 507. Scenario 501 shows that user 501 is last on the line. Scenario 500 also shows that user 501 is in possession of smart card 100.

Enlarged view 511 of smart card 100 shows that touch-sensitive screen 105 of smart card 100 is in an inactive state and is locked. When keypad 105 is inactive, information may not be entered using touch-sensitive screen 105. When touch-sensitive screen 105 is inactive, inputs entered using touch-sensitive screen 105 may not be stored on smart card 100. In some embodiments, touch-sensitive screen 105 may remain locked until smart card 100 detects that it is within range or a communication channel of ATM 507.

FIG. 5B shows scenario 502. In scenario 502, while user 501 is waiting on the line, smart card 100 determines it is within range of a communication channel of ATM 507. Smart card 100 establishes to communication channel 521 with ATM 507. In response to establishing communication channel 521, microprocessor 309 (shown in FIG. 3) unlocks touch-sensitive screen 105. At shown in 517, user 501 may remove smart card 100 and enter transaction information while waiting for users 503 and 505 to complete their transactions at ATM 507.

Enlarged view 519 shows illustrative transaction information 515 entered by user 501 while waiting on the line. Using unlocked touch-sensitive screen 105, user 501 has entered an amount—"$100." Enlarged view 519 shows that user 502 has handwritten the amount using finger motions applied to torch sensitive screen 105. Using unlocked touch-sensitive screen 105, user 501 has also entered a PIN. Enlarged view 519 shows that user 502 has handwritten the PIN using finger motions applied to touch sensitive screen 105. The PIN is represented by "xxxx" to prevent an onlooker from viewing the PIN entered by user 501.

In some embodiments, touch-sensitive screen 105 may display transaction options. The displayed transaction options may be based on capabilities of ATM 507. Smart card 100 may ascertain capabilities of ATM 507 by communicating with ATM 507 over communication channel 521. User 501 may touch a displayed transaction to select the option. Smart card 100 may prompt user 501 for additional transaction information needed to formulate transaction instructions for transmission to ATM 507. The displaying and touch selection of transaction options may speed up entry of transaction information.

Transaction information 515 may be transferred to ATM 507 while user 501 is still waiting on the line. When user 501 inserts smart card 100 into ATM 507, transaction information 515 previously entered by user 501 is used to execute a transaction at ATM 507. The transaction may be executed autonomously, using transaction information 515 previously entered by user 501.

Executing transactions based on transaction information 515 previously entered by user 501 may increase a transaction efficiency of ATM 507. For example, each of users 503 and 505 may be in possession of a smart card such as smart card 100. Each or users 503 and 505 may enter transaction information using keypad 105 before approaching ATM 507.

Based on the previously entered transaction information, transactions desired by each of users 503 and 505 may be executed by ATM 507. The desired transactions may be executed without requiring any additional prompts or inputs from users 503 or 505 after their respective smart cards are inserted into ATM 507.

As a result of reducing the number of prompts presented to users 501, 503 or 505 for information, ATM 507 may process transactions desired by users 501, 503 or 505 in less time. Accordingly, users 501, 503 or 505 each wait less time on the line before having their desired transactions executed by ATM 507.

Figure 6:
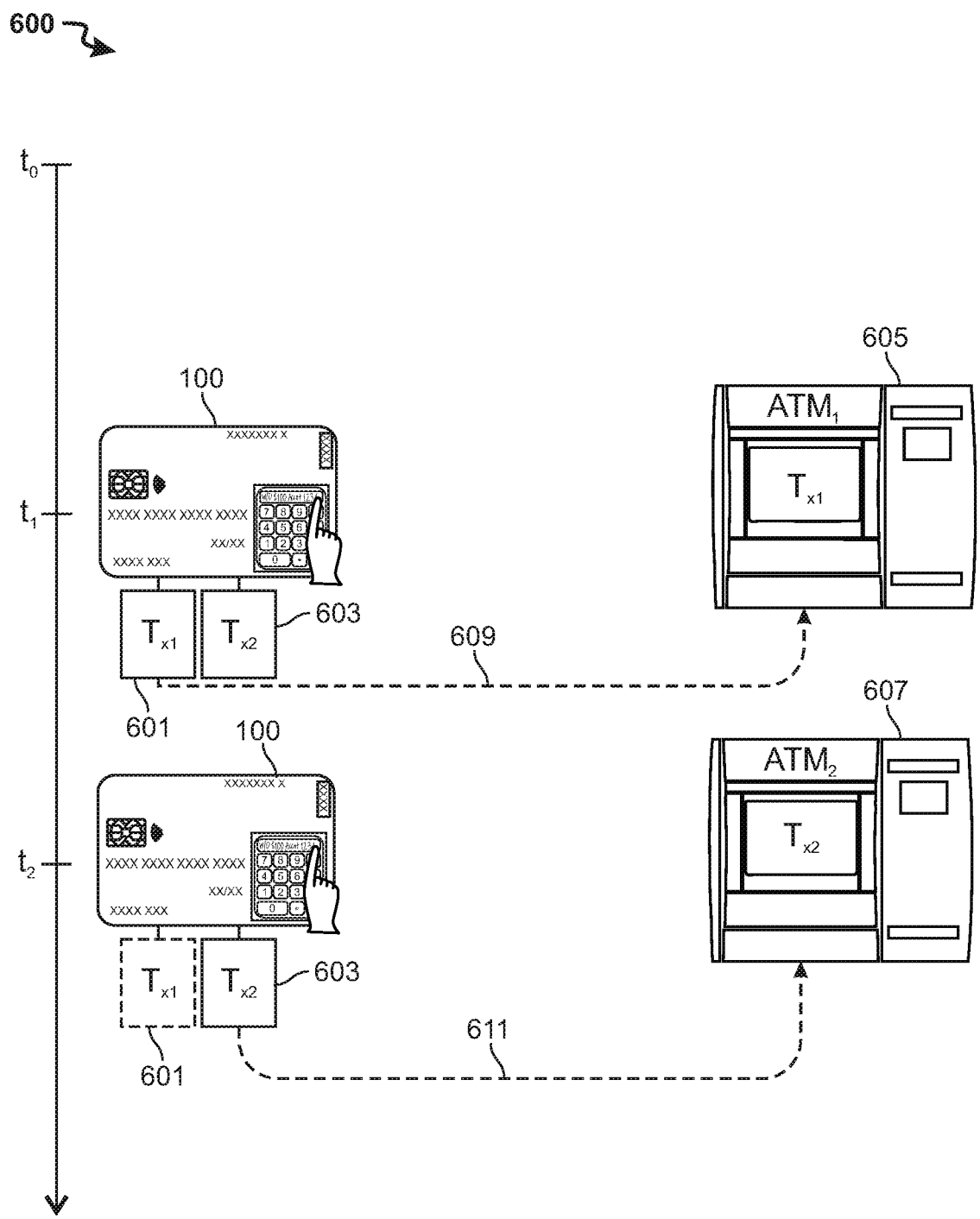
FIG. 6 shows an illustrative apparatus and process in accordance with principles of the disclosure.

FIG. 6 shows illustrative scenario 600. In scenario 600, at time smart card 100 locally stores two desired transactions—601 and 603. Each of transactions 601 and 603 may be associated with transaction information and instructions stored locally on smart card 100. Each of transactions 601 and 603 may be associated with timing restrictions. Each of transactions 601 and 603 may be associated with location restrictions. For example, the user may limit transaction 601 to being executed by $t_1$ at ATM 605. The user may limit transaction 603 to being executed by $t_2$ at ATM 607. The user may limit transaction 603 to being executed after transaction 601.

Scenario 600 shows that at $t_1$, transaction 601 is transferred to ATM 605 via communication channel 609 for execution. Scenario 600 shows that at $t_2$, transaction 603 is transferred to ATM 607 via communication channel 611 for execution. At $t_2$, because transaction 601 has already been transferred to ATM 605 at $t_1$, transaction 601 is shown in phantom lines on smart card 100.

In some embodiments, transaction 601 may be deleted from smart card 100 after being transferred to ATM 605. For example, ATM 605 may issue an instruction to smart card 100 to delete transaction 601 after ATM 605 successfully executes transaction 601.

Thus, methods and apparatus for a TOUCHSCREEN ENABLED SMART CARD are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart card that improves transaction processing efficiency of an Automated Teller Machine ("ATM"), the smart card comprising:
   a housing;
   a communication interface embedded in the housing;
   a microprocessor embedded in the housing;
   a battery that powers the communication interface and the microprocessor;
   a touch-sensitive screen that captures finger motions;
   a haptic response system;
   an EMV chip embedded in the housing; and
   executable instructions stored in a non-transitory memory, that when run by the microprocessor:
      capture the finger motions entered using the touch-sensitive screen;
      respond to the captured finger motions with the haptic response system that notifies a user that the finger motions have been successfully captured;
      encrypt the captured finger motions;
      formulate a set of transaction instructions executable by the ATM based on the captured finger motions, wherein the set of transaction instructions are sufficient to execute the transaction without the ATM requesting additional data;
      detect a location of the smart card;
      in response to the location of the smart card, dynamically adjust a range of the communication interface and thereby connect to the ATM using a target communication channel;
      in response to inserting the card into the ATM, establishing a wired communication channel between the EMV chip and the ATM; and
      in response to connecting with ATM using the target communication channel and the wired communication channel, transfer the set of transaction instructions to the ATM and autonomously initiate and complete a transaction at the ATM based on the set of transaction instructions without the ATM requesting additional data, thereby improving the transaction processing efficiency of the ATM;
   wherein:
   when the location of the smart card is within a target geographic area, the range of the communication interface is increased relative to when the smart card is outside the target geographic area via utilizing a Wi-Fi communication channel;
   when the location of the smart card is outside the target geographic area, the range of the communication interface is decreased relative to when the smart card is inside the target geographic area via not utilizing the Wi-Fi communication channel, and the touch-sensitive screen comprises a locked state in which the touch-sensitive screen is unable to capture data, and an active state in which the touch-sensitive screen is capable of capturing data and the microprocessor toggles the touch-sensitive screen from the locked state to the active state in response to a determination that the smart card is within the target geographic area, the touch-sensitive screen remaining locked until the smart card detects that the smart card is within the target geographic area; and
   the target communication channel is identified based on the target communication channel having the dynamically adjusted range of the communication interface.

2. The smart card of claim 1, wherein the finger motions entered using the touch-sensitive screen and encrypted by the microprocessor comprise:
   a personal identification number ("PIN") associated with the smart card; and
   an amount of cash desired to be withdrawn from the ATM.

3. The smart card of claim 1, the communication interface comprising a wireless communication circuit and the executable instructions, when executed by the microprocessor, initiate the transaction at the ATM in response to establishing a wireless communication channel and the wired communication channel with the ATM.

4. The smart card of claim 1, wherein the housing and the touch sensitive screen collectively have a thickness that is not greater than 0.8 millimeters ("mm").

5. The smart card of claim 1, wherein the battery is recharged via the wired communication channel when the smart card is in contact with the ATM.

6. A system for improving transaction processing efficiency of an Automated Teller Machine ("ATM"), the system comprising a smart card having a housing with a thickness not greater than 0.8 millimeters ("mm") and a surface area not greater than 86 mm×54 mm and comprising:
   a communication interface embedded within the housing;
   a microprocessor embedded within the housing;
   an EMV chip embedded in the housing; and
   a user input system in electronic communication with the microprocessor, the user input system comprising:
      a touch-sensitive screen;
      an input controller that captures data entered using the touch-sensitive screen;
      a voice controller that generates an audio message confirming the data captured by the input controller;
      a haptic response system that generates haptic feedback in response to the data captured by the input controller;
      a location controller that determines a location of the smart card;
      an encryption controller that encrypts the data captured by the input controller; and
   executable instructions stored in a non-transitory memory, that when run by the microprocessor:
      based on the location of the smart card, expand or limit a range of the communication interface;
      based on the range of the communication interface, establish a secure communication channel with the ATM using the communication interface;

self-authenticate the smart card over the secure communication channel; and in response to inserting the card into the ATM, establish a wired communication channel between the EMV chip and the ATM, transfer the encrypted data captured by the input controller and thereby autonomously trigger execution of a transaction at the ATM, thereby improving the transaction processing efficiency of the ATM;

wherein:

the data captured by the input controller is sufficient to execute the transaction without the ATM prompting for additional data;

when the location of the smart card is within a target geographic area, the secure communication channel utilizes a Wi-Fi communication channel, and the range of the secure communication channel is thereby longer than when the location of the smart card is outside the target geographic area;

when the location is outside the target geographic area, the secure communication channel does not utilize the Wi-Fi communication channel, and the range of the secure communication channel is thereby shorter than when the location of the smart card is inside the target geographic area; and and the touch-sensitive screen comprises a locked state in which the touch-sensitive screen is unable to capture data, and an active state in which the touch-sensitive screen is capable of capturing data and the microprocessor toggles the touch-sensitive screen from the locked state to the active state in response to a determination that the smart card is inside the target geographic area, the touch-sensitive screen remaining locked until the smart card detects that the smart card is within the target geographic area.

7. The system of claim 6, the smart card further comprising a mechanical keypad;

wherein:

the encryption controller encrypts data captured by the mechanical keypad; and the mechanical keypad does not enlarge the thickness or surface area of the smart card.

8. The system of claim 6 wherein the transaction is a first transaction and the ATM is a first ATM, the executable instructions stored in the non-transitory memory, when run by the microprocessor are configured to:

store first transaction instructions and a second transaction instructions locally on the smart card;

stage the first transaction at the first ATM by transferring the first transaction instructions to the first ATM; and stage the second transaction at a second ATM by transferring the second transaction instructions to the second ATM after the first transaction is executed by the first ATM.

9. The system of claim 6, wherein the executable instructions stored in a non-transitory memory, when run by the microprocessor purge the encrypted data from the smart card when the smart card does not establish a contact-based communication channel with the ATM within a pre-determined time period.

10. The system of claim 6, the ATM comprising:

a front controller that receives the encrypted data from the communication interface over the secure communication channel;

a decryption controller that decrypts the encrypted data;

an input validation controller that communicates with a remote computer server and validates the encrypted data; and a payment dispatcher that dispenses cash in response to a positive validation received from the input validation controller.

11. The system of claim 6, the smart card further comprising a wireless communication circuit and the executable instructions stored in the non-transitory memory, when run by the microprocessor:

scan for a wireless ATM communication channel; and in response to detecting the wireless ATM communication channel, determine whether the communication interface can communicate with the wireless ATM communication channel without exceeding the expanded or limited range of the communication interface; and in response to detecting that the wireless ATM communication channel is within the expanded or limited range:

transfer the encrypted data to the ATM over the wireless ATM communication channel;

stage the transaction at the ATM; and execute the staged transaction after establishing contact-based communication with the ATM.

12. The system of claim 11, wherein the data entered using the touch-sensitive screen comprises finger motions, the executable instructions stored in the non-transitory memory, when run by the microprocessor:

translate the finger motions into digital transaction instructions; and stage the transaction at the ATM by transmitting the digital transaction instructions to the ATM.

13. A method of improving transaction processing efficiency of an Automated Teller Machine ("ATM"), the method comprising, on a processor of a smart card, executing machine executable instructions stored on a non-transitory memory, the machine executable instructions, when executed by the processor:

capture transaction information using a touch-sensitive screen embedded in the smart card;

using a haptic response system, provide one or more haptic responses to the captured transaction information confirming the captured transaction information;

encrypt the transaction information;

store the encrypted transaction information locally on the smart card;

formulate executable transaction instructions based on the encrypted transaction information stored locally on the smart card;

determine a location of the smart card;

in response to the location of the smart card, dynamically adjust a range of a communication interface embedded within the smart card;

using the communication interface, detect at least two available ATM communication channels;

establish communication with the ATM using a target ATM communication channel, wherein the target ATM communication is one of the at least two available ATM communication channels, and the target ATM communication channel is selected based on the target ATM communication channel having the dynamically adjusted range currently associated with the communication interface of the smart card;

using an EMV chip embedded in the card and in response to inserting the card into the ATM, establishing a wired communication channel with the ATM; and transfer the transaction instructions from the smart card to the ATM using the target ATM communication channel and the wired communication channel and trigger execution of the transaction instructions at the ATM without receiving any input from a user of the smart card after transferring the transaction instructions from the smart card to the ATM;

wherein:

when the location of the smart card is within a target geographic area, the range of the communication interface is increased relative to when the smart card is outside the target geographic area, via utilizing a Wi-Fi communication channel;

when the location is outside the target geographic area, the range of the secure communication channel is shorter than when the location of the smart card is inside the target geographic area, via not utilizing the Wi-Fi communication channel; and the touch-sensitive screen comprises a locked state in which the touch-sensitive screen is unable to capture data, and an active state in which the touch-sensitive screen is capable of capturing data and the microprocessor toggles the touch-sensitive screen from the locked state to the active state in response to a determination that the smart card is within the target geographic area, the touch-sensitive screen remaining locked until the smart card detects that the smart card is within the target geographic area.

14. The method of claim 13, wherein the target ATM communication channel is a contact-based communication channel.

15. The method of claim 13, wherein the target ATM communication channel is a wireless communication channel.

16. The method of claim 13, further comprising on the processor of the smart card, executing machine executable instructions stored on the non-transitory memory, the machine executable instructions, when executed by the processor:

using the touch sensitive screen, provide visual confirmation of the captured transaction information; and display, using the touch sensitive screen, alternative transaction options from a drop-down list.

* * * * *